US009665655B2

(12) United States Patent
Todeschini et al.

(10) Patent No.: US 9,665,655 B2
(45) Date of Patent: *May 30, 2017

(54) CLOUD-BASED SYSTEM FOR READING OF DECODABLE INDICIA

(71) Applicant: Honeywell International, Inc., Fort Mill, SC (US)

(72) Inventors: Erik Todeschini, Camillus, NY (US); Stephen Patrick Deloge, Palmyra, NY (US); Timothy P. Meier, Camillus, NY (US); Donald Anderson, Locke, NY (US); Benjamin Hejl, Cherry Hill, NJ (US); Thomas J. Koziol, Camillus, NY (US)

(73) Assignee: Honeywell International, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,745

(22) Filed: Jul. 15, 2016

(65) Prior Publication Data

US 2016/0321372 A1   Nov. 3, 2016

Related U.S. Application Data

(63) Continuation of application No. 14/744,836, filed on Jun. 19, 2015, now Pat. No. 9,398,008, which is a
(Continued)

(51) Int. Cl.
*G06F 17/30* (2006.01)
*G06Q 30/04* (2012.01)
(Continued)

(52) U.S. Cl.
CPC ..... *G06F 17/30876* (2013.01); *G06K 7/1443* (2013.01); *G06K 7/1447* (2013.01); *G06Q 20/3274* (2013.01); *G06Q 30/04* (2013.01); *H04L 9/0861* (2013.01); *H04L 9/3263* (2013.01); *H04L 63/06* (2013.01);
(Continued)

(58) Field of Classification Search
USPC .............. 235/375, 462.46, 454; 705/1, 14.23
See application file for complete search history.

(56) References Cited

U.S. PATENT DOCUMENTS 6,618,709 B1   9/2003   Sneeringer
6,659,344 B2   12/2003  Otto et al.
(Continued)

OTHER PUBLICATIONS

EPC GLOBAL, Specification for RFID Air Interface, EPC Radio-Frequency Identity Protocols Class-1 Generation-2 UHF RFID Protocol for Communications at 860 MHz-960 MHz, Version 1.0.9, Jan. 31, 2005, pp. 1-94.

*Primary Examiner* — Allyson Trail
(74) *Attorney, Agent, or Firm* — Additon, Higgins & Pendleton, P.A.

(57) ABSTRACT

A data decoding system can comprise one or more computers communicatively coupled to a network. The computers can execute at least one decoding process. The decoding process can be configured, responsive to receiving a decoding request comprising an image of decodable indicia, to locate the decodable indicia within the image, and to decode the decodable indicia into a decoded message. The decoding process can be further configured, responsive to completing a decoding operation, to transmit to the client the decoded message and/or the decoding operation completion code.

20 Claims, 8 Drawing Sheets

Related U.S. Application Data continuation of application No. 13/474,014, filed on May 17, 2012, now Pat. No. 9,064,254.

(51) Int. Cl.
  *G06Q 20/32* (2012.01)
  *G06K 7/14* (2006.01)
  *H04L 9/32* (2006.01)
  *H04L 29/06* (2006.01)
  *H04L 9/08* (2006.01)

(52) U.S. Cl.
  CPC ...... *H04L 63/0823* (2013.01); *H04L 63/0869* (2013.01); *G06Q 2220/00* (2013.01); *H04L 2209/24* (2013.01); *H04L 2209/64* (2013.01)

(56) References Cited

U.S. PATENT DOCUMENTS

| | | |
|---|---|---|
| 7,003,138 B2 | 2/2006 | Wilson |
| 7,015,967 B1 | 3/2006 | Kochi et al. |
| 7,159,770 B2 | 1/2007 | Onozu |
| 7,178,163 B2 | 2/2007 | Reeves |
| 7,237,721 B2 | 7/2007 | Bilcu et al. |
| 7,287,696 B2 | 10/2007 | Attia et al. |
| 7,308,158 B2 | 12/2007 | Herbert et al. |
| 7,405,662 B2 | 7/2008 | Steinke et al. |
| 7,407,096 B2 | 8/2008 | McQueen et al. |
| 7,419,097 B2 | 9/2008 | Lee et al. |
| 7,480,737 B2 | 1/2009 | Chauffour et al. |
| 7,494,063 B2 | 2/2009 | Kotlarsky et al. |
| 7,501,950 B2 | 3/2009 | Suzuki |
| 7,535,361 B2 | 5/2009 | Doan et al. |
| 7,551,090 B2 | 6/2009 | Doan et al. |
| 7,602,288 B2 | 10/2009 | Broussard |
| 7,627,191 B2 | 12/2009 | Xu et al. |
| 7,677,602 B2 | 3/2010 | Bennett et al. |
| 7,696,874 B2 | 4/2010 | Stevens |
| 7,702,187 B2 | 4/2010 | Rusman et al. |
| 7,708,205 B2 | 5/2010 | Kotlarsky et al. |
| 7,735,731 B2 | 6/2010 | Skaaksrud et al. |
| 7,756,292 B2 | 7/2010 | Lev |
| 7,756,319 B2 | 7/2010 | Odell |
| 7,786,865 B2 | 8/2010 | Park |
| 7,786,925 B1 | 8/2010 | Knibbe et al. |
| 7,815,121 B2 | 10/2010 | Kotlarsky et al. |
| 7,821,400 B2 | 10/2010 | Tabet et al. |
| 7,831,082 B2 | 11/2010 | Holsing et al. |
| 7,831,912 B2 | 11/2010 | King et al. |
| 7,855,643 B2 | 12/2010 | Tuttle |
| 7,861,936 B2 | 1/2011 | Kotlarsky et al. |
| 7,870,999 B2 | 1/2011 | Skaaksrud et al. |
| 7,883,013 B2 | 2/2011 | Skaaksrud et al. |
| 7,886,972 B2 | 2/2011 | Skaaksrud et al. |
| 7,950,698 B2 | 5/2011 | Popadic et al. |
| 7,951,003 B2 | 5/2011 | Russell et al. |
| 7,961,908 B2 | 6/2011 | Tzur et al. |
| 7,965,186 B2 | 6/2011 | Downie et al. |
| 7,988,050 B2 | 8/2011 | Kitada et al. |
| 8,046,311 B2 | 10/2011 | Ferraro et al. |
| 8,079,525 B1 | 12/2011 | Zolotov |
| 8,087,583 B2 | 1/2012 | Hawes |
| 8,115,601 B2 | 2/2012 | Nonaka |
| 8,120,818 B2 | 2/2012 | Nagata |
| 8,139,117 B2 | 3/2012 | Dwinell et al. |
| 8,139,249 B2 | 3/2012 | Venable |
| 8,149,094 B2 | 4/2012 | Deoalikar et al. |
| 8,256,664 B1 | 9/2012 | Balfanz et al. |
| 8,485,430 B2 | 7/2013 | Qu et al. |
| 9,064,254 B2 | 6/2015 | Todeschini et al. |
| 9,398,008 B2 | 7/2016 | Todeschini et al. |
| 2001/0047426 A1 | 11/2001 | Hunter |
| 2002/0165758 A1 | 11/2002 | Hind et al. |
| 2005/0212817 A1 | 9/2005 | Cannon et al. |
| 2005/0283448 A1 | 12/2005 | Dixon et al. |
| 2006/0262961 A1 | 11/2006 | Holsing et al. |
| 2006/0266836 A1 | 11/2006 | Bilcu et al. |
| 2007/0008136 A1 | 1/2007 | Suzuki |
| 2007/0028001 A1 | 2/2007 | Phillips et al. |
| 2007/0063050 A1 | 3/2007 | Attia et al. |
| 2007/0102506 A1 | 5/2007 | Stevens |
| 2007/0199995 A1 | 8/2007 | Kotlarsky et al. |
| 2007/0215706 A1 | 9/2007 | Kotlarsky et al. |
| 2008/0037899 A1 | 2/2008 | Xu et al. |
| 2008/0061937 A1 | 3/2008 | Park |
| 2008/0111661 A1 | 5/2008 | Lin et al. |
| 2008/0129825 A1 | 6/2008 | DeAngelis et al. |
| 2008/0164313 A1 | 7/2008 | Kotlarsky et al. |
| 2008/0164317 A1 | 7/2008 | Kotlarsky et al. |
| 2008/0169343 A1 | 7/2008 | Skaaksrud et al. |
| 2008/0172303 A1 | 7/2008 | Skaaksrud et al. |
| 2008/0173706 A1 | 7/2008 | Skaaksrud et al. |
| 2008/0173710 A1 | 7/2008 | Skaaksrud et al. |
| 2008/0203147 A1 | 8/2008 | Skaaksrud et al. |
| 2008/0203166 A1 | 8/2008 | Skaaksrud et al. |
| 2008/0210749 A1 | 9/2008 | Skaaksrud et al. |
| 2008/0210750 A1 | 9/2008 | Skaaksrud et al. |
| 2008/0224870 A1 | 9/2008 | Yeo et al. |
| 2008/0244076 A1 | 10/2008 | Shah et al. |
| 2008/0247363 A1 | 10/2008 | Lee et al. |
| 2008/0285091 A1 | 11/2008 | Skaaksrud et al. |
| 2008/0300898 A1 | 12/2008 | Bacha et al. |
| 2009/0021353 A1 | 1/2009 | Nanaka |
| 2009/0040025 A1 | 2/2009 | Volpi et al. |
| 2009/0045913 A1 | 2/2009 | Nelson et al. |
| 2009/0045924 A1 | 2/2009 | Roberts et al. |
| 2009/0109484 A1 | 4/2009 | Honda |
| 2009/0121025 A1 | 5/2009 | Romanchik |
| 2009/0161964 A1 | 6/2009 | Tzur et al. |
| 2009/0190183 A1 | 7/2009 | Hosoda |
| 2009/0214137 A1 | 8/2009 | Takahashi |
| 2009/0218405 A1 | 9/2009 | Joseph et al. |
| 2009/0243801 A1 | 10/2009 | Strzelczyk |
| 2009/0245755 A1 | 10/2009 | Lee et al. |
| 2009/0300106 A1 | 12/2009 | Woodside et al. |
| 2009/0307232 A1 | 12/2009 | Hall |
| 2009/0322537 A1 | 12/2009 | Tapp et al. |
| 2010/0005156 A1 | 1/2010 | Wesby |
| 2010/0045436 A1 | 2/2010 | Rinkes |
| 2010/0046842 A1 | 2/2010 | Conwell |
| 2010/0048242 A1 | 2/2010 | Rhoads et al. |
| 2010/0072269 A1 | 3/2010 | Scott et al. |
| 2010/0073487 A1 | 3/2010 | Sogoh et al. |
| 2010/0084470 A1 | 4/2010 | Scott et al. |
| 2010/0091313 A1 | 4/2010 | Kitada et al. |
| 2010/0109903 A1 | 5/2010 | Carrick |
| 2010/0142825 A1 | 6/2010 | Maxwell et al. |
| 2010/0145709 A1 | 6/2010 | Kumar |
| 2010/0148985 A1 | 6/2010 | Lin et al. |
| 2010/0163632 A1 | 7/2010 | Tseng et al. |
| 2010/0187311 A1 | 7/2010 | Van Der Merwe et al. |
| 2010/0189367 A1 | 7/2010 | Van Der Merwe et al. |
| 2010/0200660 A1 | 8/2010 | Moed et al. |
| 2010/0201488 A1 | 8/2010 | Stern et al. |
| 2010/0201520 A1 | 8/2010 | Stern et al. |
| 2010/0220894 A1 | 9/2010 | Ackley et al. |
| 2010/0226530 A1 | 9/2010 | Lev |
| 2010/0232712 A1 | 9/2010 | Tomita et al. |
| 2010/0250351 A1 | 9/2010 | Gillenson et al. |
| 2010/0250356 A1 | 9/2010 | Gillenson et al. |
| 2010/0250359 A1 | 9/2010 | Gillenson et al. |
| 2010/0252621 A1 | 10/2010 | Ito et al. |
| 2010/0260426 A1 | 10/2010 | Huang et al. |
| 2010/0271187 A1 | 10/2010 | Uysal et al. |
| 2010/0296753 A1 | 11/2010 | Ito et al. |
| 2010/0303348 A1 | 12/2010 | Tolliver et al. |
| 2010/0308964 A1 | 12/2010 | Ackley et al. |
| 2010/0327066 A1 | 12/2010 | Khan |
| 2011/0000958 A1 | 1/2011 | Herzig |
| 2011/0011936 A1 | 1/2011 | Morandi et al. |
| 2011/0019220 A1 | 1/2011 | Kikuchi |
| 2011/0019816 A1 | 1/2011 | Inami et al. |
| 2011/0026081 A1 | 2/2011 | Hamada et al. |
| 2011/0029363 A1 | 2/2011 | Gillenson et al. |

(56) References Cited

U.S. PATENT DOCUMENTS

| | | |
|---|---|---|
| 2011/0034176 A1 | 2/2011 | Lord et al. |
| 2011/0052008 A1 | 3/2011 | Holsing et al. |
| 2011/0081948 A1 | 4/2011 | Shirai et al. |
| 2011/0084808 A1 | 4/2011 | Tuttle |
| 2011/0102642 A1 | 5/2011 | Wang et al. |
| 2011/0115947 A1 | 5/2011 | Oh |
| 2011/0115950 A1 | 5/2011 | Wach |
| 2011/0128125 A1 | 6/2011 | Kai et al. |
| 2011/0143811 A1 | 6/2011 | Rodriguez |
| 2011/0155808 A1 | 6/2011 | Santos et al. |
| 2011/0200256 A1 | 8/2011 | Saubat et al. |
| 2011/0205387 A1 | 8/2011 | Tzur et al. |
| 2011/0207531 A1 | 8/2011 | Gagner et al. |
| 2011/0210171 A1 | 9/2011 | Brown et al. |
| 2011/0211726 A1 | 9/2011 | Moed et al. |
| 2011/0212717 A1 | 9/2011 | Rhoads et al. |
| 2011/0222757 A1 | 9/2011 | Yeatman, Jr. et al. |
| 2011/0251093 A1 | 10/2011 | Xia et al. |
| 2011/0280447 A1 | 11/2011 | Conwell |
| 2011/0284625 A1 | 11/2011 | Smith et al. |
| 2011/0290883 A1 | 12/2011 | Kotlarsky et al. |
| 2011/0310442 A1 | 12/2011 | Popadic et al. |
| 2011/0311026 A1 | 12/2011 | Lalena |
| 2012/0037695 A1 | 2/2012 | Liu et al. |
| 2012/0047424 A1 | 2/2012 | Rothschild |
| 2012/0048920 A1 | 3/2012 | Iizaka |
| 2012/0063690 A1 | 3/2012 | Ashok et al. |
| 2012/0064971 A1 | 3/2012 | Devine et al. |
| 2012/0079544 A1 | 3/2012 | Massimino |
| 2012/0091204 A1 | 4/2012 | Shi |
| 2012/0221724 A1 | 8/2012 | Chor |
| 2013/0142444 A1 | 6/2013 | Qu et al. |
| 2013/0159080 A1 | 6/2013 | Wu et al. |
| 2013/0194077 A1 | 8/2013 | Vargas et al. |
| 2013/0277427 A1 | 10/2013 | Zumsteg et al. |
| 2013/0277430 A1 | 10/2013 | Zumsteg et al. |
| 2013/0278386 A1 | 10/2013 | Zumsteg |
| 2013/0278393 A1 | 10/2013 | Zumsteg |
| 2013/0306720 A1 | 11/2013 | Todeschini et al. |
| 2013/0306736 A1 | 11/2013 | Yeakley et al. |
| 2014/0001254 A1 | 1/2014 | Williams et al. |
| 2014/0014724 A1 | 1/2014 | Koziol et al. |
| 2014/0021256 A1 | 1/2014 | Qu et al. |
| 2014/0051054 A1 | 2/2014 | Wong et al. |
| 2014/0189353 A1 | 7/2014 | Apsangi et al. |

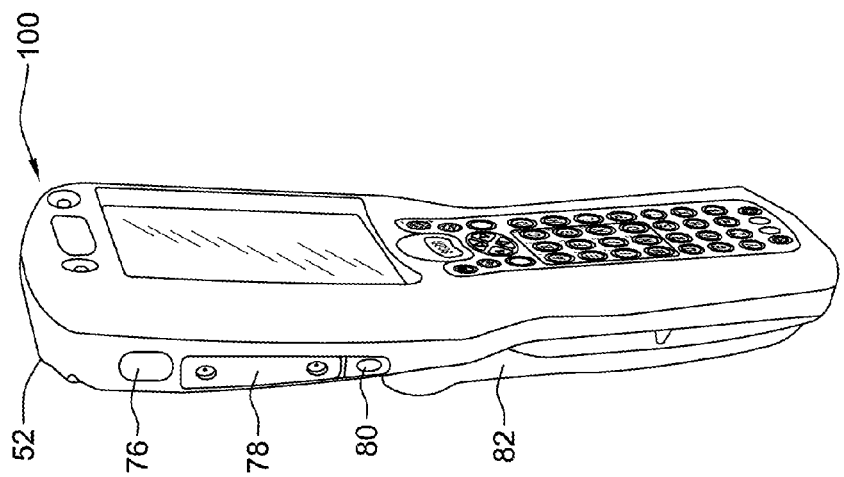
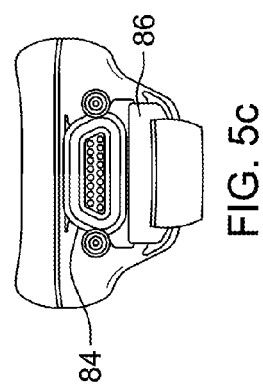
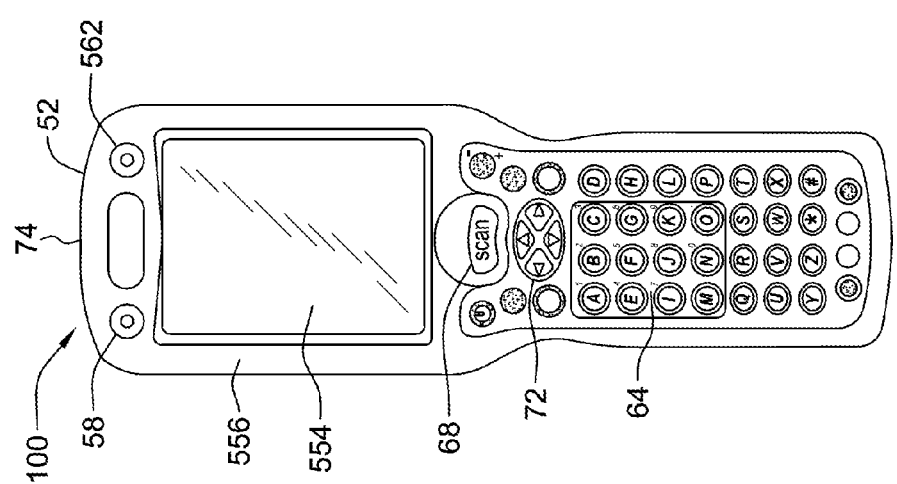
FIG. 5b
FIG. 5c
FIG. 5a

CLOUD-BASED SYSTEM FOR READING OF DECODABLE INDICIA

CROSS-REFERENCE TO RELATED APPLICATION

The present application claims the benefit of U.S. patent application Ser. No. 14/744,836 for a Cloud-Based System for Reading of Decodable Indicia filed Jun. 19, 2015 (and published Oct. 8, 2015 as U.S. Patent Publication No. 2015/0288689), now U.S. Pat. No. 9,398,008, which claims the benefit of U.S. patent application Ser. No. 13/474,014 for a Cloud-Based System for Reading of Decodable Indicia filed May 17, 2012 (and published Nov. 21, 2013 as U.S. Patent Application Publication No. 2013/0306720), now U.S. Pat. No. 9,064,254. Each of the foregoing patent applications, patent publications, and patents is hereby incorporated by reference in its entirety.

FIELD OF THE INVENTION

The invention is generally related to systems for the reading of decodable indicia and is specifically related to cloud-based systems for the reading of decodable indicia.

BACKGROUND

Decodable indicia are patterns, marks, or messages which are designed to be scanned and interpreted by computer and/or other mechanical and/or automated methods. Many known types of decodable indicia fall under the category of barcodes. Barcodes are graphical representations of data, the most common of which are referred to as one dimensional (1D) and two dimensional (2D) barcodes. 1D barcodes are graphical entities that represent data by varying the widths and spacing of parallel lines. 2D barcodes are also graphical entities that represent data, but in addition to the parallel lines, or bars, a 2D barcode may contain rectangles, dots, hexagons and other geometric patterns in two dimensions. The data encoded in the barcodes are interpreted by optical scanners and/or software. Barcodes can be scanned by special optical scanners called barcode readers as well as by general purpose devices such as smart phones. Other types of decodable indicia include optical character recognition (OCR), glyphs, or other visual markings. Also, non-visual technologies such as magnetic strips, radio-frequency identification (RFID), and other non-visual technologies fall under the definition of decodable indicia as well.

SUMMARY

In one embodiment, there is provided a data decoding system comprising one or more computers communicatively coupled to a network. The computers can execute at least one client authentication process and at least one decoding process. The authentication process can be configured to authenticate a client. The decoding process can be configured, responsive to receiving from the client a decoding request comprising an image of decodable indicia, to locate the decodable indicia within the image, and to decode the decodable indicia into a decoded message. The decoding process can be further configured, responsive to completing the decoding operation, to transmit to the client the decoded message and/or the decoding operation completion code.

In some embodiments, the authentication process and the decoding process can be executed by the same computer. Alternatively, the authentication process and the decoding process can be executed by different computers.

In some embodiments, the client authentication process can be configured, responsive to receiving an authentication request comprising a client certificate, to negotiate a common secret with the client. The authentication process can be further configured to create at least one cryptographic key based on the common secret, and to use the cryptographic key to encrypt messages transmitted to the client and/or decrypt messages received from the client.

In a further aspect, the computers can be further configured, responsive to receiving an authentication request comprising a client certificate, to validate the client certificate by transmitting a validation request to a certificate authority issuing the client certificate.

In another embodiment, there is provided a data decoding system comprising one or more computers communicatively coupled to a network. The computers can execute at least one decoding process and at least one logging process. The decoding process can be configured, responsive to receiving a decoding request comprising an image of decodable indicia, to locate the decodable indicia within the image, and to decode the decodable indicia into a decoded message. The decoding process can be further configured, responsive to completing the decoding operation, to transmit to the client the decoded message and/or the decoding operation completion code. The decoding process can be further configured, responsive to completing the decoding operation, to transmit a logging request to the logging process. The logging process can be configured, responsive to receiving the logging request, to create a usage tracking record in a usage tracking database. The usage tracking record can comprise a client identifier, the image, the decoded message, and/or the decoding operation completion code.

In some embodiments, the logging process and the decoding process can be executed by the same computer. Alternatively, the logging process and the decoding process can be executed by different computers.

In a further aspect, the decoding request and/or the usage tracking record can further comprise one or more values of client configuration parameters.

In yet another embodiment, there is provided a data decoding system comprising one or more computers communicatively coupled to a network. The computers can execute at least one decoding process. The decoding process can be configured, responsive to receiving from a client a decoding request comprising an image of decodable indicia, to locate the decodable indicia within the image. The decoding process can be further configured, responsive to successfully locating the decodable indicia, to decode the decodable indicia into a decoded message. The decoding process can be further configured, responsive to completing a decoding operation, to transmit to the client at least one of: the decoded message, a decoding operation completion code. The computers can be further configured to validate an entitlement of the client to receive decoding services responsive to receiving the decoding request and/or transmit a billing request to a billing system responsive to completing the decoding operation.

In a further aspect, the billing request can comprise the client identifier, the symbology type, and/or the number of decodable indicia items to be decoded.

In a further aspect, the computers can be configured to validate the entitlement of the client by transmitting a client entitlement validation request to the billing system. The client entitlement validation request can comprise a client identifier, the symbology type, and/or the number of decodable indicia items to be decoded.

In a further aspect, the decoding process can be configured to transmit the decoded message to the client responsive to receiving a billing transaction confirmation from the billing system.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 5a-5c, 6, and 7 schematically illustrate embodiments of a mobile communication terminal;

The drawings are not necessarily to scale, emphasis instead generally being placed upon illustrating the principles of the invention. In the drawings, like numerals are used to indicate like parts throughout the various views.

DETAILED DESCRIPTION

Figure 1:
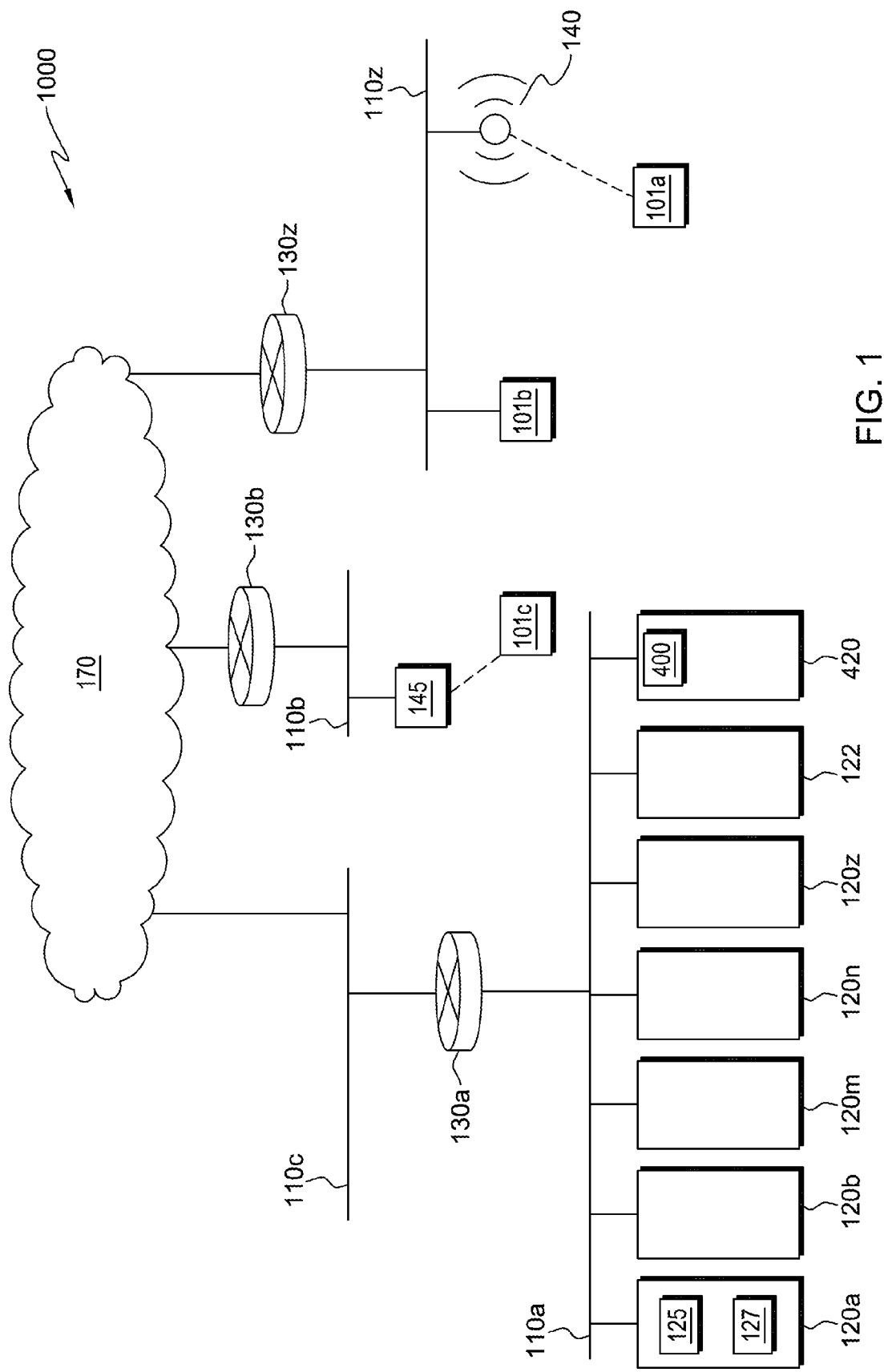
FIG. 1 schematically illustrates a component diagram of one embodiment of a data decoding system.

Capture of decodable indicia can utilize many types of technologies. Laser scanning or linear imaging can be used for the capture of 1D barcodes. Some 2D barcodes known as stacked codes, such as PDF417, can be read using these technologies as well, however 2D bar codes known as matrix codes require devices which can capture a 2 dimensional (2D) image of the bar code. These 2D images are also useful for decoding 1D, 2D stacked codes, as well as OCR or other visual decodable indicia. For things like RFID, magnetic strips or other non-visual decodable indicia, these may involve use of RF, magnetic reading heads, or other non-visual means of capture. For the purposes of this invention, the capture of any decodable indicia will be referred to generally as "imaging", and the captured representation of the decodable indicia by a device will be referred to as an "image".

A growing variety of devices are currently being used for bar code reading and decoding, ranging from specialized scanners to smart phones. Supporting multiple hardware and software platforms can become challenging for suppliers of decoding software. One solution to supporting a large number of bar code reading devices representing a variety of platforms is to split the imaging and decoding functions: an image comprising decodable indicia can be taken by a portable or stationary scanner, e.g., by a point-of-sale (POS) device, and can then be transmitted to an external server for decoding. Since the decoding client can be completely agnostic with respect to decoding algorithms employed by the server, the problem of supporting a large variety of client platforms can be solved by creating thin client imaging applications. A typical thin client imaging application only needs to be able to transfer an image of decodable indicia to a decoding server over a network, and then receive decoded message data from the server. As used herein, "message" is intended to denote a character string comprising alphanumeric and/or non-alphanumeric characters. An encoded message can be used to convey information, such as identification of the source and the model of a product, for example, in a UPC code.

In one embodiment, there is provided an optical indicia decoding system comprising-one or more computers communicatively coupled to a network and executing one or more decoding processes. A "computer" herein shall refer to a programmable device for data processing, including a central processing unit (CPU), a memory, and at least one communication interface. For example, in one embodiment, a computer can be provided by an Intel-based server running Linux operating system. In another embodiment, a computer can be provided by a virtual server, i.e., an isolated instance of a guest operating system running within a host operating system. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the network layer of the OSI model can comprise a plurality of lower layer networks. A "process" herein shall refer to an instance of a computer program that is being executed; in some operating systems, several processes can be instantiated simultaneously from the same computer program.

The decoding process can be configured, responsive to receiving from a decoding client a decoding request including a decodable indicia image, to locate the decodable indicia within the image, and then, responsive to successfully locating the decodable indicia, to decode the decodable indicia into a decoded message, and to transmit the decoded message back to the decoding client.

In one embodiment, schematically shown in FIG. 1, a decoding system 1000 can comprise a plurality of computers 120a-120z communicatively coupled to a network 110a. Network 110a can be provided, e.g., by Ethernet-based local area network, and can be communicatively coupled to the Internet 170 via one or more routers 130a and/or one or more networks 110a-110c. A decoding client 101a can be provided by a mobile communication terminal communicatively coupled to a local area network 110z via a wireless access point 140. Network 110z can be communicatively coupled to the Internet 170 via one or more routers 130z and/or one or more networks 110z. A decoding client 101b can be provided by a terminal mounted into a point-of-sale (POS) workstation and can be communicatively coupled to the local area network 110z via an Ethernet communication interface. A decoding client 101c can be provided by a smart phone communicatively coupled to a provider's network 110b via a cellular base station 145. Network 110b can be communicatively coupled to the Internet 170 via one or more routers 130b and/or one or more networks 110b.

Wireless access point 140 could be configured to support Bluetooth, Near Field Communication (NFC) ISO/IEC 18092 and/or ISO/IEC 14443, the IEEE 802.11/802.15/802.16 protocol family, or other wireless technology. Cellular base station 145 could be configured to include HSPA/GSM/GPRS/EDGE protocol family, TDMA protocol, UMTS protocol, LTE protocol, the CDMA/1xEV-DO protocol family, and/or other cellular technology.

In one embodiment, the decoding system 1000 can follow a cloud computing model, by providing an on-demand network access to a shared pool of configurable computing resources (e.g., servers, storage, applications, and/or services) that can be rapidly provisioned and released with minimal or no resource management effort, including interaction with the service provider, by the consumer (operator of a thin client). One characteristic of the cloud computing model is that a consumer can unilaterally provision computing capabilities, such as CPU power and storage capacity on the network, as needed automatically without requiring human interaction with the service's provider. The resources of the cloud can be accessed by thin clients over a network.

In another aspect, decoding clients can access cloud-based decoding applications executed by computers 120a-120z via a single point of entry, e.g., via a single IP address or uniform resource identifier (URI). In one embodiment, the single point of entry IP address can be assigned to a load balancing component provided, e.g., by router 130a or by a dedicated load balancer 122. In another embodiment, the single point of entry URI can include a fully-qualified host name resolvable by a DNS server into one or more IP addresses of computers 120a-120z. In a yet another embodiment, the single point of entry URI can include a fully-qualified host name resolvable by a DNS server into an IP address of the dedicated load balancer 122 which can act as a server-side HTTP proxy by forwarding HTTP requests from the decoding clients 101a-101c to HTTP processes running on the decoding computers 120a-120z. The server-side HTTP proxy can preserve HTTP or application-level sessions by forwarding all TCP packets from one client to the same server. Thus, a decoding client accessing the cloud-based decoding applications can be agnostic with respect to the number of computers 120a-120z, topology of the local area networks 110a-110z, aspects of load balancing among the computers 120a-120z and other server-side implementation details.

For preventing unauthorized access to the cloud-based decoding services, decoding system 1000 can require a decoding client to be authenticated before processing any decoding requests. In one embodiment, the client authentication can be performed utilizing digital certificates. A digital certificate can be issued to a decoding client 101a-101c by a certificate authority controlled by a trusted third party or the decoding service provider. A digital certificate can be digitally signed by the issuing certificate authority and can comprise an identifier and a public encryption key of the certificate holder. The certificate authority can also provide a private encryption key to the certificate holder. The public/private key pair can be used to encrypt and decrypt messages so that a message encrypted by a public key can only be decrypted using the matching private key.

Figure 2:
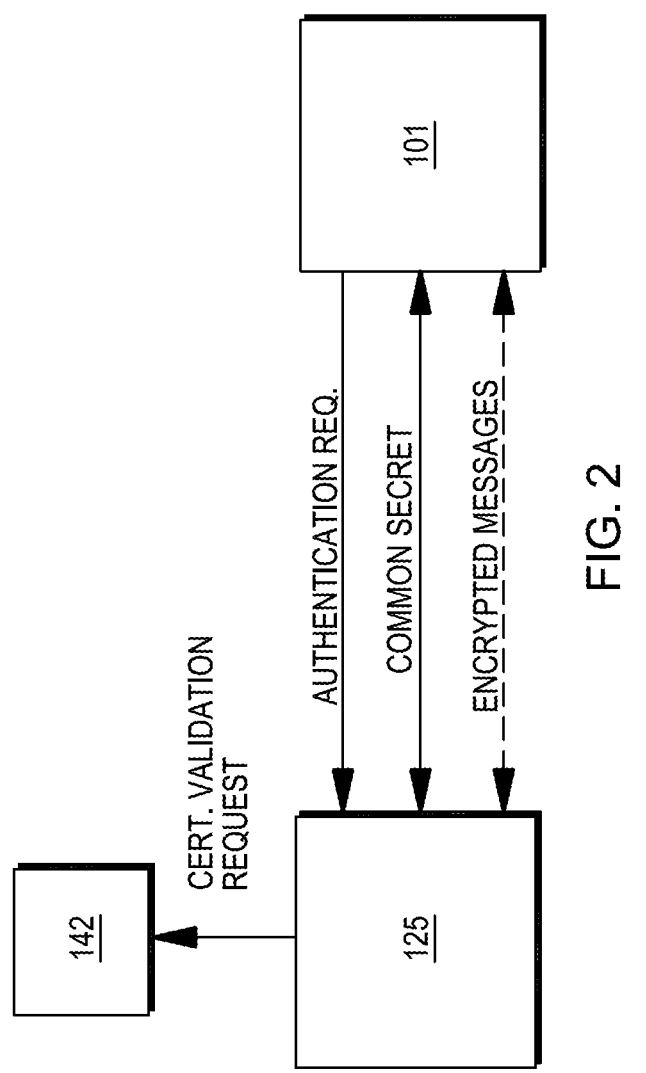
FIG. 2 schematically illustrates one embodiment of a method of authenticating a decoding client.

One embodiment of a method of authenticating a client by a cloud-based computer is now being described with references to FIG. 2. At least one of the cloud-based computers 120a-120z can be configured to execute at least one authentication process 125. A decoding client 101 can initiate an authentication procedure by transmitting an authentication request to an authentication process 125. The authentication request can comprise the digital certificate issued to the client 101 by the certificate authority 142. Responsive to receiving the authentication request, the authentication process 125 can validate the client certificate. In one embodiment, the client certificate can be validated by the authentication process 125 transmitting a certificate validation request to the certificate authority 142. In one embodiment, the client certificate can be validated by the authentication process 125 performing a lookup in a certificate revocation list issued by the certificate authority 142.

The authentication process 125 can then negotiate a common secret with the client 101. To prevent eavesdropping by a malicious third party, the authentication process 125 can encrypt the messages addressed to the client 101 using the client's public key, so that the messages could only be decrypted using the client's private key. Thus, a common secret can be negotiated by the client 101 and the authentication process 125 over a secure communication channel. The common secret can then be used by each of the client 101 and the authentication process 125 to derive a symmetric encryption key (e.g., by calculating a hash function of the common secret) used to encrypt and decrypt the subsequent communications.

In another embodiment, the authentication process 125 can perform a password-based authentication method. The operator of the decoding client device 101 can be prompted to enter a password via a user interface. The decoding client device 101 can transmit to the authentication process 125 a binary string derived from the password (e.g., a value of a pre-defined hash-function of the password string). The authentication process 125 can authenticate the client device 101 by calculating the hash function of the received binary string and comparing the value with a value stored in a permanent memory accessible by the authentication process 125 (e.g., a LDAP server).

In a further aspect, upon successfully authenticating the client device 101, the authentication process 125 can encrypt the messages addressed to the decoding client 101 using an encryption key derived from a common secret, e.g., by calculating a hash function of the common secret. In one embodiment, the common secret can be communicated to the decoding client 101 using an alternative communication channel (e.g., via an external memory device such as a USB memory stick, via a user interface, etc.).

In a yet another embodiment, the authentication process 125 can authenticate the decoding client 101 based on a network address (e.g., an IP address) of the decoding client. This embodiment can be particularly useful when one or more decoding clients are connecting to an enterprise network—with a known IP address range, and/or via a client-side proxy with a known IP address of the external (Internet-side) interface.

In a yet another embodiment, the authentication process 125 can authenticate the decoding client 101 based on biometric data (e.g., a fingerprint of the operator of the decoding client 101).

A skilled artisan would appreciate the fact that other authentication methods are within the scope of the invention.

With reference back to FIG. 1, in one embodiment, one or more authentication processes 125 can be executed by one or more dedicated computers 120a-120m, and one or more decoding processes can be executed by one or more dedicated computers 120n-120z. In another embodiment, at least one of computers 120a-120z can be configured to execute at least one authentication process and at least one decoding process. In a yet another embodiment, the authentication computer performing the client authentication can be provided by the router 130a.

In a further aspect, the authentication process can act as a transparent server-side proxy to at least one decoding process: upon authenticating a decoding client, the authentication process can receive one or more of decoding requests from the authenticated decoding client, and forward the decoding requests to the decoding process.

In a further aspect, a decoding process can, responsive to completing a decoding operation, transmit the decoding operation result including decoded message data and/or the decoding operation completion code to the decoding client. In one embodiment, the decoding process can transmit the decoding operation result to the authentication process, which then can forward the decoding operation result to the client that transmitted the decoding request.

In one embodiment, one or more of the cloud-based computers 120a-120z can execute at least one logging process configured to log decoding requests and results in a usage tracking database, by creating a usage tracking record comprising a client identifier, a decodable indicia image, a decoded message and/or a decoding operation completion code. In one embodiment, the decoding process can be configured, responsive to completing a decoding operation, to transmit a logging request to the logging process. The logging process can be configured, responsive to receiving a logging request from a decoding process, to create a usage tracking record in the usage tracking database. In one embodiment, the usage tracking database can be provided by a relational database. In another embodiment, the usage tracking database can be provided by a flat file.

In one embodiment, one or more logging processes can be executed by one or more dedicated computers 120a-120m, and one or more decoding processes can be executed by one or more dedicated computers 120n-120z. In another embodiment, at least one of computers 120a-120z can be configured to execute at least one decoding process and at least one logging process.

In a further aspect, a decoding request transmitted by the decoding client can comprise one or more client configuration parameters, for example, client device model, client device serial number, aperture value, shutter speed, and ISO value. In one embodiment, the decoding process can include one or more client configuration parameters into the usage tracking record.

Figure 3A:
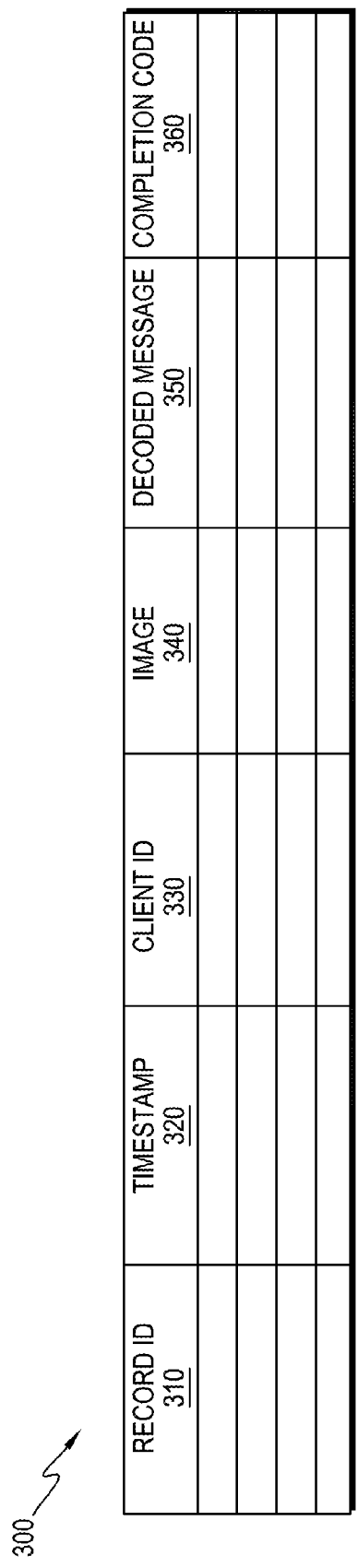
FIGS. 3a-3b schematically illustrate various embodiments of the structure of a usage tracking database table.
Figure 3B:
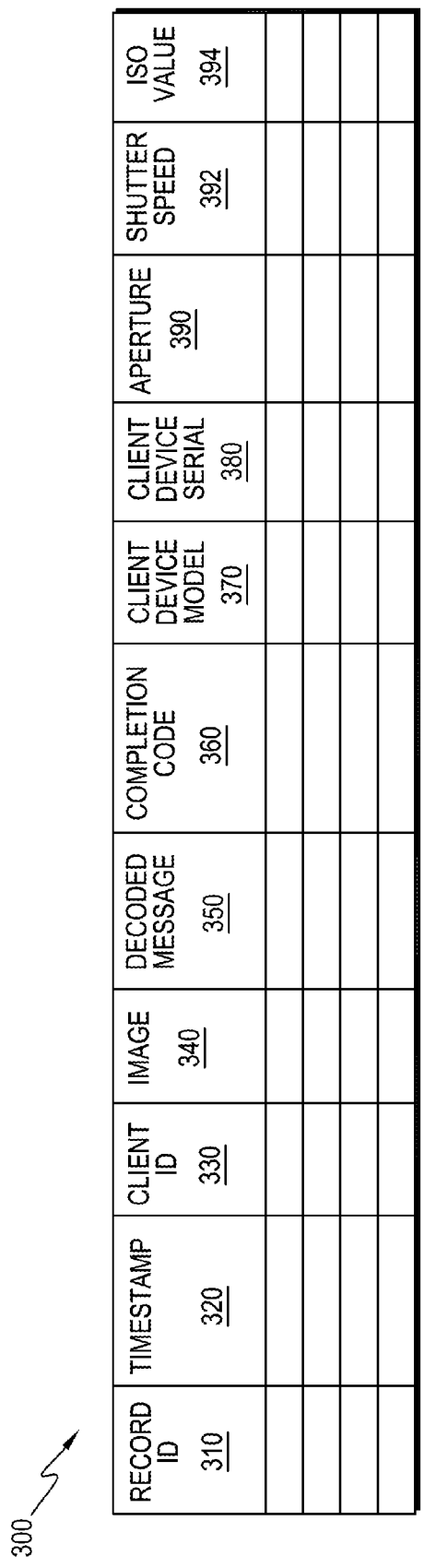

One embodiment of a structure of the usage tracking database table is schematically shown in FIG. 3a. The usage tracking table 300 can include a record identifier field 310, a timestamp field 320, a client identifier field 330, a decodable indicia image field 340, a decoded message field 350, a decoding operation completion code 360. In another embodiment, schematically shown in FIG. 3b, the usage tracking table 300 can further include a client device model 370, a client device serial number 380, an aperture value 390, a shutter speed 392, and/or an ISO value 394.

In another aspect, the decoding system 1000 can support a variety of billing models, including usage-based model ("pay per scan"), unlimited usage model, and numerous hybrid models. In one embodiment, a decoding process can be configured, responsive to receiving a decoding request, to validate the client entitlement to receive decoding services. In one embodiment shown in FIG. 4, a billing system 400 can run on a dedicated computer 420 (shown in FIG. 1) which can be located within the same facility with at least one computer 120a-120z executing at least one decoding process 127, or can be located remotely and can be accessible by the decoding process 127 over one or more networks 110a-110z. In another embodiment not shown in the figures, the billing system 400 of FIG. 4 can run on the computer 120a-120z of FIG. 1 executing at least one decoding process 127.

Figure 4:
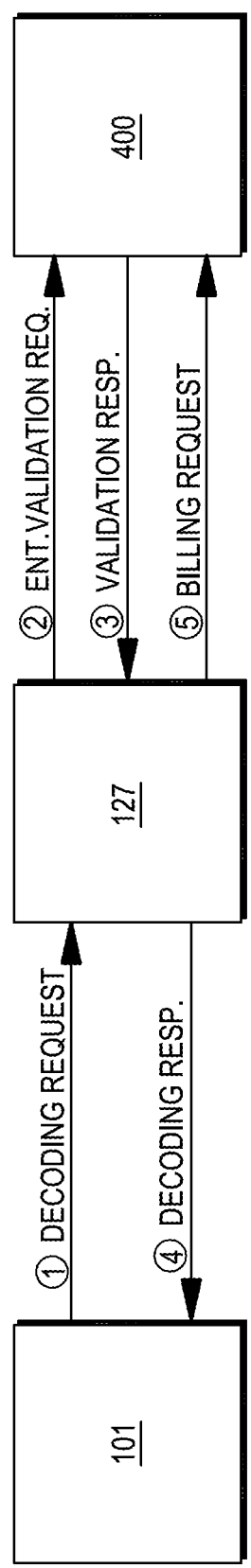
FIG. 4 schematically illustrates one embodiment of a method of interacting with a billing system by the data decoding system.

In one embodiment, schematically shown in FIG. 4, the decoding process 127 can validate the client entitlement by transmitting an entitlement validation request to a billing system 400. The client entitlement validation request can comprise the client identifier and the type of the requested service. For example, the client entitlement validation request can comprise the symbology type and/or the number of decodable indicia items to be decoded.

The billing system 400 can verify the entitlement of the client to receive the requested service and can return the validation result to the decoding process 127. Responsive to receiving a negative entitlement confirmation, the decoding process 127 can return a corresponding error code to the decoding client.

In a further aspect, responsive to completing a decoding operation, the decoding process 127 can transmit a billing request to the billing system. The billing request can include the client identifier and the type of performed service. For example, the billing request can include a processor elapsed time. In another example, the billing request can include number of decoding attempts. In a yet another example, the billing request can include the size of the image processed. In a yet another example, the billing request can include the type and/or the number of decoded decodable indicia.

In some embodiments, the entitlement request and the billing request can be combined into a single request.

In a further aspect, billing system 400 can support a variety of billing models, including usage-based model ("pay per scan"), unlimited usage model, and numerous hybrid models.

In a pay-per-scan model, billing system 400 can process a billing request by initiating a payment transaction. Alternatively, billing system 400 can process a billing request by appending a billing item to an invoice to be forwarded to the appropriate customer.

In some embodiment, responsive to successfully processing the billing request, billing system 400 can transmit a billing confirmation to decoding process 127. In some embodiment, transmitting decoding operation completion code and/or decoding message to the requesting client 101 by decoding process 127 can only be performed upon receiving the billing confirmation from the billing system.

In another aspect, the image of decodable indicia can be provided by a raw image byte stream or a compressed image byte stream (e.g., GIFF, TIFF, JPEG or other standard or proprietary format).

In another aspect, the decoding client can be provided by a large variety of imaging devices. In one embodiment, the decoding client can be provided by a mobile computing device (e.g., a mobile communication terminal, or a smartphone) comprising an integrated imaging device or a peripheral imaging device. An integrated imaging device can be provided, e.g., by a two-dimensional imager incorporated into the housing of the mobile computing device and communicatively coupled to other components of the mobile computing device, including, e.g., a data bus, a processor, or a communication interface. A peripheral imaging device can be provided, e.g., by a still image or video camera disposed in a separate housing and communicatively coupled to the mobile computing device (e.g., via Bluetooth interface).

In another embodiment, the decoding client can be provided by a general purpose computing device (e.g., a notebook computer or a desktop computer) comprising an integrated imaging device or a peripheral imaging device.

In a yet another embodiment, the decoding client can be provided by a computing device integrated into a POS system (e.g., a retail cashier's workstation) comprising an integrated imaging device or a peripheral imaging device.

As noted herein supra, in one embodiment, the decoding client can be provided by a mobile communication terminal. One embodiment of a mobile communication terminal 100 is shown in FIGS. 5a (front panel view), 5b (side panel view), and 5c (bottom panel view). Mobile communication terminal 100 can comprise a housing 52 within which other components of mobile communication terminal 100 can be disposed. An LCD screen display with a touch screen sensor 554 can be disposed on the front panel 556. Also disposed on the front panel 556 can be a decode LED 58, a scan led 562, and a keyboard 64 including a scan key 68 and navigation keys 72. An imaging window 74 can be disposed on the top panel of housing 52. Disposed on the side panel (best viewed in FIG. 5b) can be an infra-red communication port 76, an access door to a secure digital (SD) memory interface 78, an audio jack 80, and a hand strap 82. Disposed on the bottom panel (best viewed in FIG. 5c) can be a multi-pin mechanical connector 84 and a hand strap clip 86.

Figure 6:
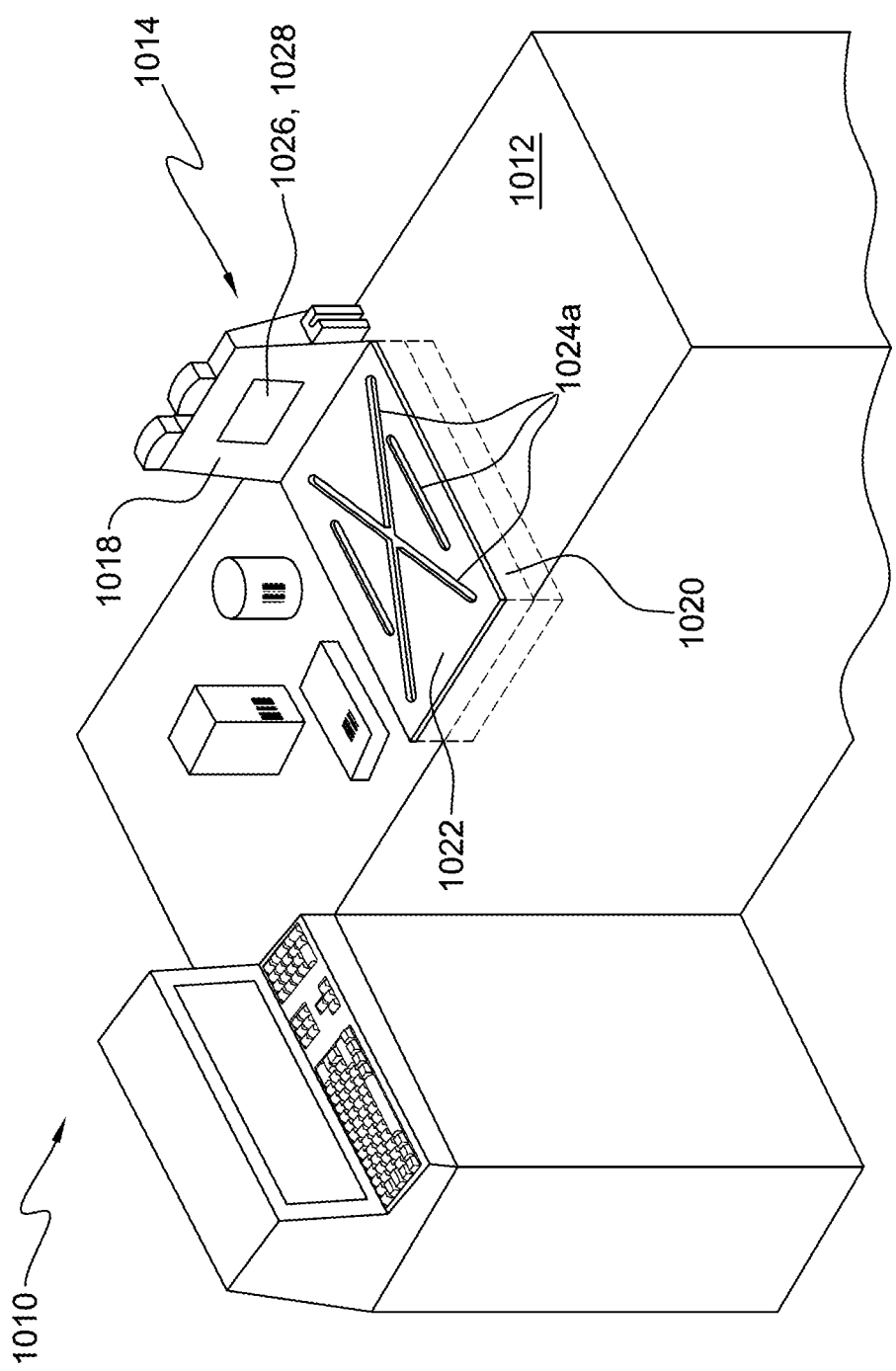

While FIGS. 5a-5c illustrate a hand held housing, a skilled artisan would appreciate the fact that other types and form factors of terminal housings are within the scope of this disclosure. For example, in one embodiment schematically shown in FIG. 6, a communication terminal can be incorporated into a POS workstation with a presentation housing. The workstation 1010 can include a horizontal countertop 1012 for placement of products to be scanned. A bioptic scanner 1014 mounted within the countertop 1012 can include a first housing portion 1016 and a second housing portion 1018 which can project from one end of the first housing portion in a substantially orthogonal manner. In one embodiment, the first housing portion 1016 can comprise a laser-based indicia scanning terminal and the second housing portion 1018 can comprise an imager-based terminal. The countertop 1012 can include an optically transparent (e.g., glass) horizontal-scanning window 1020 mounted flush with the checkout counter, covered by an imaging window protection plate 1022 which can be provided with a pattern of apertures 1024a. The second housing portion 1018 can further include a vertical-scanning window 1026 behind which an imager-based indicia reading terminal 1028 can be housed. A skilled artisan would appreciate the fact that other ways of disposing the scanners and scanning windows are within the scope of this disclosure.

Figure 7:
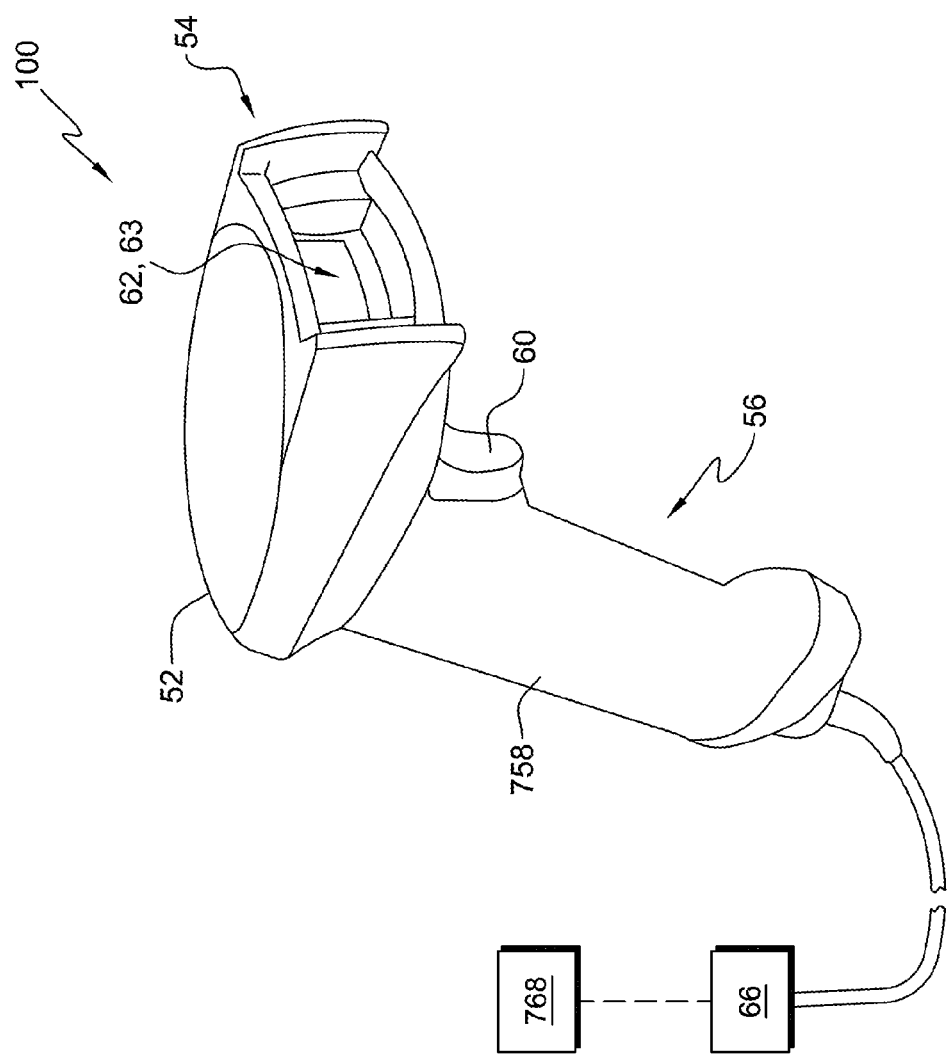

In another illustrative embodiment, shown in FIG. 7, there is provided a mobile communication terminal 100 including a housing 52 comprising a head portion 54 and a handle portion 56, the latter further comprising a hand grip 758 and a trigger 60. The trigger 60 can be used to initiate signals for activating frame readout and/or certain decoding processes. Other components of Mobile communication terminal 100 can be disposed within the housing 52. For example, an image sensor 62 can be disposed in the head portion 54 behind a housing window 63. The image sensor 62 can be configured to output an electrical signal representative of light incident on the image sensor. Mobile communication terminal 100 can further comprise an I/O interface which in the illustrative embodiment of FIG. 7 can be communicatively coupled to a wired connection 66. The I/O interface can be used to communicatively couple Mobile communication terminal 100 to a companion device 768 such as a register and/or peripheral data capture devices in a point-of-sale (POS) application. Other configurations of the I/O interface may utilize wireless communication technology and/or contact-type features that do not require wires and/or wired connection 66. In certain applications of mobile communication terminal 100 for example, the companion device 768 may be provided by a docking station with corresponding mating contacts and/or connectors that are useful to exchange power and data, including image data captured by the image sensor 62. Although not incorporated in the illustrative embodiment of FIG. 7, mobile communication terminal 100 can also comprise a number of peripheral devices, including a display for displaying such information as image frames captured by the terminal, a keyboard, and a pointing device.

Mobile communication terminals described herein supra can be used, for example, for bar code reading in POS and other applications. A skilled artisan would appreciate the fact that other uses of Mobile communication terminals are within the scope of this disclosure.

Figure 8:
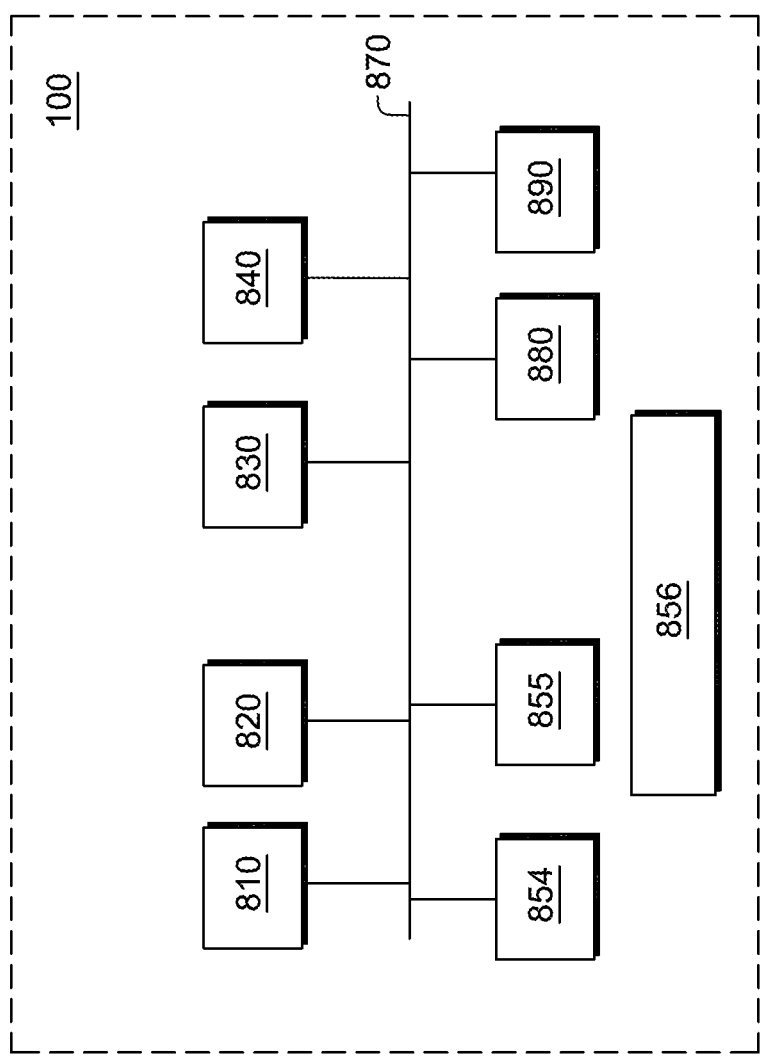
FIG. 8 depicts component-level layout of a mobile communication terminal.

Component-level diagram of one embodiment of a mobile communication terminal is now being described with references to FIG. 8. Mobile communication terminal 100 can comprise at least one microprocessor 810 and a memory 820, both coupled to the system bus 870. The microprocessor 810 can be provided by a general purpose microprocessor or by a specialized microprocessor (e.g., an ASIC). In one embodiment, mobile communication terminal 100 can comprise a single microprocessor which can be referred to as a central processing unit (CPU). In another embodiment, mobile communication terminal 100 can comprise two or more microprocessors, for example, a CPU providing some or most of the mobile communication terminal functionality and a specialized microprocessor performing some specific functionality. A skilled artisan would appreciate the fact that other schemes of processing tasks distribution among two or more microprocessors are within the scope of this disclosure.

Mobile communication terminal 100 can further comprise a communication interface 840 communicatively coupled to the system bus 870. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family.

Mobile communication terminal 100 can further comprise a keyboard interface 854 and a display adapter 855, both also coupled to the system bus 870. Mobile communication terminal 100 can further comprise a battery 856. In one embodiment, the battery 856 can be provided by a replaceable rechargeable battery pack. Mobile communication terminal 100 can further comprise a GPS receiver 880. Mobile communication terminal 100 can further comprise at least one connector 890 configured to receive a subscriber identity module (SIM) card. Mobile communication terminal 100 can further comprise an imaging device 830, provided, for example, by a two-dimensional imager.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems, methods, and apparatuses that are described herein is as follows:

A1. A data decoding system comprising one or more computers communicatively coupled to a network, said one or more computers executing at least one client authentication process and at least one decoding process;

wherein said client authentication process is configured to authenticate a client;

wherein said at least one decoding process is configured, responsive to receiving a decoding request from said client, said decoding request comprising an image of decodable indicia, to locate said decodable indicia within said image;

wherein said at least one decoding process is further configured, responsive to successfully locating said decodable indicia, to decode said decodable indicia into a decoded message; and wherein said at least one decoding process is further configured, responsive to completing a decoding operation, to transmit to said client at least one of: said decoded message, a decoding operation completion code.

A2. The data decoding system of (A1), wherein said at least one authentication process and said at least one decoding process are executed by one computer.

A3. The data decoding system of (A1), wherein said at least one authentication process is executed by a first computer; and wherein said at least one decoding process is executed by a second computer.

A4. The data decoding system of (A1), wherein said image of decodable indicia is provided by one of: a raw image byte stream, a compressed image byte stream.

A5. The data decoding system of (A1), wherein said client is provided by a mobile communication terminal comprising an optical reading device configured to output said image of decodable indicia.

A6. The data decoding system of (A1), wherein said client is provided by a mobile computing device comprising one of: an integrated imaging device, a peripheral imaging device.

A7. The data decoding system of (A1), wherein said client is provided by a desktop computer comprising one of: an integrated imaging device, a peripheral imaging device.

A8. The data decoding system of (A1), wherein said client is provided by a computing device integrated into a point-of-sale system, said computing device comprising one of: an integrated imaging device, a peripheral imaging device.

A9. The data decoding system of (A1), wherein said at least one client authentication process is configured, responsive to receiving from a client an authentication request comprising a client certificate, to negotiate a common secret with said client;

wherein said at least one authentication process is further configured to create at least one cryptographic key based on said common secret; and wherein said at least one authentication process is further configured to use said at least one cryptographic key to perform at least one of: encrypting one or more messages transmitted to said client; decrypting one or more messages received from said client.

A10. The data decoding system of (A9), wherein said at least one computer is further configured, responsive to receiving from a client an authentication request comprising a client certificate, to validate said client certificate by transmitting a validation request to a certificate authority issuing said client certificate.

B1. A data decoding system comprising one or more computers communicatively coupled to a network, said one or more computers executing at least one decoding process and at least one logging process;

wherein said at least one decoding process is configured, responsive to receiving a decoding request comprising an image of decodable indicia from a client, to locate said decodable indicia within said image;

wherein said at least one decoding process is further configured, responsive to successfully locating said decodable indicia, to decode said decodable indicia into a decoded message;

wherein said at least one decoding process is further configured, responsive to completing a decoding operation, to transmit to said client at least one of: said decoded message, a decoding operation completion code;

wherein said at least one decoding process is further configured, responsive to completing said decoding operation, to transmit a logging request to said at least one logging process; and wherein said at least one logging process is configured, responsive to receiving said logging request from said at least on decoding process, to create a usage tracking record in a usage tracking database, said usage tracking record comprising a client identifier, said image, and at least one of: said decoded message, said decoding operation completion code.

B2. The data decoding system of (B1), wherein said at least one decoding process and said at least one logging process are executed by one computer.

B3. The data decoding system of (B1), wherein said at least one decoding process is executed by a first computer; and wherein said at least one logging process is executed by a second computer.

B5. The data decoding system of (B1), wherein said decoding request further comprises one or more values of client configuration parameters; and wherein said usage tracking record further comprises said one or more values of client configuration parameters.

B5. The data decoding system of (B1), wherein said image of decodable indicia is provided by one of: a raw image byte stream, a compressed image byte stream.

B6. The data decoding system of (B1), wherein said client is provided by a mobile communication terminal comprising an optical reading device configured to output said image of decodable indicia.

B7. The data decoding system of (B1), wherein said client is provided by a mobile computing device comprising one of: an integrated imaging device, a peripheral imaging device.

B8. The data decoding system of (B1), wherein said client is provided by a desktop computer comprising one of: an integrated imaging device, a peripheral imaging device.

B9. The data decoding system of (B1), wherein said client is provided by a computing device integrated into a point-of-sale system, said computing device comprising one of: an integrated imaging device, a peripheral imaging device.

C1. A data decoding system comprising one or more computers communicatively coupled to a network;

wherein at least one computer of said one or more computers is configured, responsive to receiving from a client a decoding request comprising an image of decodable indicia, to locate said decodable indicia within said image;

wherein said at least one computer is further configured, responsive to successfully locating said decodable indicia, to decode said decodable indicia into a decoded message;

wherein said at least one computer is further configured, responsive to completing a decoding operation, to transmit to said client at least one of: said decoded message, a decoding operation completion code; and wherein said at least one computer is further configured to perform at least one of: validating an entitlement of said client to receive decoding services responsive to receiving said decoding request, transmit a billing request to a billing system responsive to completing said decoding operation.

C2. The data decoding system of (C1), wherein said billing request comprises at least one of: an identifier of said client, a symbology type of said decodable indicia, a number of decodable indicia items to be decoded.

C3. The data decoding system of (C1), wherein said at least one computer is configured to validate said entitlement of said client by transmitting a client entitlement validation request to said billing system.

C4. The data decoding system of (C3), wherein said client entitlement validation request comprises at least one of: an identifier of said client, a symbology type of said decodable indicia, a number of decodable indicia items to be decoded.

C5. The data decoding system of (C1), wherein said at least one computer is configured to transmit said decoded message to said client responsive to receiving a billing transaction confirmation from said billing system.

C6. The data decoding system of C1, wherein said image of decodable indicia is provided by one of: a raw image byte stream, a compressed image byte stream.

C7. The data decoding system of C1, wherein said client is provided by a mobile communication terminal comprising an optical reading device configured to output said image of decodable indicia.

C8. The data decoding system of C1, wherein said client is provided by a mobile computing device comprising one of: an integrated imaging device, a peripheral imaging device.

C9. The data decoding system of C1, wherein said client is provided by a desktop computer comprising one of: an integrated imaging device, a peripheral imaging device.

C10. The data decoding system of C1, wherein said client is provided by a computing device integrated into a point-of-sale system, said computing device comprising one of: an integrated imaging device, a peripheral imaging device.

The invention claimed is:

1. A method, comprising:
   authenticating, with one or more computers communicatively coupled to a network, a client;
   simultaneously with an initiation of authenticating a client, creating, with the one or more computers, a usage tracking record in a usage tracking database comprising a client identifier;
   in response to receiving a decoding request from a client, the decoding request comprising an image of decodable indicia, locating, with the one or more computers, the decodable indicia within the image;
   in response to successfully locating the decodable indicia, decoding, with the one or more computers, the decodable indicia into a decoded message;
   in response to completing a decoding operation, transmitting to the client, with the one or more computers, the decoded message and/or a decoding operation completion code; and
   in response to completing the decoding operation, updating, with the one or more computers, the usage tracking database comprising the client identifier.

2. The method of claim 1, wherein updating the usage tracking database comprising the client identifier comprises updating the usage tracking database comprising the client identifier with the image and the decoded message and/or the decoding operation completion code.

3. The method of claim 1, comprising:
   authenticating the client with a first computer; and
   decoding the decodable indicia with a second computer.

4. The method of claim 1, wherein the client is provided by a mobile computing device comprising one of: an integrated imaging device, a peripheral imaging device.

5. The method of claim 1, wherein the client is provided by a desktop computer comprising one of: an integrated imaging device, a peripheral imaging device.

6. The method of claim 1, comprising:
   in response to receiving from a client an authentication request comprising a client certificate, negotiating, with the one or more computers, a common secret with the client;
   creating, with the one or more computers, a cryptographic key based on the common secret; and
   using, with the one or more computers, the cryptographic key to perform at least one of: encrypting one or more messages transmitted to the client; decrypting one or more messages received from the client.

7. The method of claim 6, comprising, in response to receiving from a client an authentication request comprising a client certificate, transmitting, with the one or more computers, a validation request to a certificate authority issuing the client certificate.

8. A method, comprising:
   creating, with one or more computers communicatively coupled to a network, a usage tracking record in a usage tracking database comprising a client identifier;
   in response to receiving a decoding request from a client, the decoding request comprising an image of decodable indicia, locating, with the one or more computers, the decodable indicia within the image;
   in response to successfully locating the decodable indicia, decoding, with the one or more computers, the decodable indicia into a decoded message;
   in response to completing a decoding operation, transmitting, with the one or more computers, a logging request; and
   in response to receiving the logging request, updating, with the one or more computers, the usage tracking database comprising the client identifier with the image and the decoded message and/or the decoding operation completion code.

9. The method of claim 8, comprising:
   decoding the decodable indicia with a first computer; and
   updating the usage tracking database with a second computer.

10. The method of claim 8, wherein the decoding request comprises one or more values of client configuration parameters; and
   wherein the usage tracking record comprises the one or more values of client configuration parameters.

11. The method of claim 8, wherein the client is provided by a mobile communication terminal comprising an optical reading device configured to output the image of decodable indicia.

12. The method of claim 8, wherein the client is provided by a desktop computer comprising one of: an integrated imaging device, a peripheral imaging device.

13. The method of claim 8, wherein the client is provided by a computing device integrated into a point-of-sale system, the computing device comprising one of: an integrated imaging device, a peripheral imaging device.

14. A method, comprising:
   creating, with one or more computers communicatively coupled to a network, a usage tracking record in a usage tracking database comprising a client identifier;
   in response to receiving a decoding request from a client, the decoding request comprising an image of decodable indicia, locating, with the one or more computers, the decodable indicia within the image;

in response to successfully locating the decodable indicia, decoding, with the one or more computers, the decodable indicia into a decoded message;

in response to completing a decoding operation, transmitting to the client, with the one or more computers, the decoded message and/or a decoding operation completion code;

in response to completing a decoding operation, transmitting, with the one or more computers, a logging request;

in response to receiving the logging request, updating, with the one or more computers, the usage tracking database comprising the client identifier with the image and the decoded message and/or the decoding operation completion code;

in response to successfully locating the decodable indicia, determining, with the one or more computers, a symbology type of the decodable indicia; and in response to determining the symbology type of the decodable indicia, transmitting, with the one or more computers, a billing request to a billing system, the billing request comprising the determined symbology type of the decodable indicia.

15. The method of claim 14, wherein the billing request comprises an identifier of the client and/or a number of decodable indicia items to be decoded.

16. The method of claim 14, comprising transmitting, with the one or more computers, the decoded message to the client in response to receiving a billing transaction confirmation from the billing system.

17. The method of claim 14, wherein the client is provided by a mobile communication terminal comprising an optical reading device configured to output the image of decodable indicia.

18. The method of claim 14, wherein the client is provided by a mobile computing device comprising one of: an integrated imaging device, a peripheral imaging device.

19. The method of claim 14, wherein the client is provided by a desktop computer comprising one of: an integrated imaging device, a peripheral imaging device.

20. The method of claim 14, wherein the client is provided by a computing device integrated into a point-of-sale system, the computing device comprising one of: an integrated imaging device, a peripheral imaging device.

* * * * *